US011111326B2

(12) United States Patent
Hintzer et al.

(10) Patent No.: US 11,111,326 B2
(45) Date of Patent: Sep. 7, 2021

(54) HIGHLY FLUORINATED ELASTOMERS

(71) Applicant: 3M INNOVATIVE PROPERTIES COMPANY, St. Paul, MN (US)

(72) Inventors: Klaus Hintzer, Kastl (DE); Florian D. Jochum, Neuotting (DE); Harald Kaspar, Burgkirchen (DE); Kai H. Lochhaas, Neuotting (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/036,824

(22) PCT Filed: Nov. 26, 2014

(86) PCT No.: PCT/US2014/067564
§ 371 (c)(1),
(2) Date: May 16, 2016

(87) PCT Pub. No.: WO2015/088784
PCT Pub. Date: Jun. 18, 2015

(65) Prior Publication Data
US 2016/0280824 A1 Sep. 29, 2016

Related U.S. Application Data

(60) Provisional application No. 61/914,457, filed on Dec. 11, 2013.

(51) Int. Cl.
*C08F 214/26* (2006.01)
*C08K 5/14* (2006.01)
*C08K 5/095* (2006.01)
*C08K 5/06* (2006.01)

(52) U.S. Cl.
CPC ........ *C08F 214/262* (2013.01); *C08F 214/26* (2013.01); *C08K 5/14* (2013.01); *C08K 5/06* (2013.01); *C08K 5/095* (2013.01)

(58) Field of Classification Search
CPC .. C08F 214/262; C08F 214/16; C08F 214/26; C08F 2/28; C08K 5/14; C08K 5/095; C08K 5/06; C08L 2203/18; C08G 65/007
See application file for complete search history.

(56) References Cited

U.S. PATENT DOCUMENTS

| 3,467,638 | A | | 9/1969 | Pattison | |
|---|---|---|---|---|---|
| 3,682,872 | A | | 8/1972 | Brizzolara | |
| 4,035,565 | A | | 7/1977 | Apotheker | |
| 4,281,092 | A | | 7/1981 | Breazeale | |
| 4,694,045 | A | * | 9/1987 | Moore | C08F 214/262 525/276 |
| 4,910,276 | A | | 3/1990 | Nakamura | |
| 4,972,038 | A | | 11/1990 | Logothetis | |
| 5,001,278 | A | * | 3/1991 | Oka | C07C 43/17 526/242 |
| 6,114,452 | A | | 9/2000 | Schmiegel | |
| 6,140,437 | A | | 10/2000 | Kitaichi et al. | |
| 7,312,289 | B2 | | 12/2007 | Saito et al. | |
| 8,604,137 | B2 | | 12/2013 | Grootaert | |
| 2002/0103304 | A1 | * | 8/2002 | Hintzer | B32B 25/08 525/326.2 |
| 2002/0198345 | A1 | * | 12/2002 | Grootaert | C08F 14/26 526/247 |
| 2006/0135717 | A1 | * | 6/2006 | Hintzer | C08F 214/18 526/250 |
| 2010/0240791 | A1 | | 9/2010 | Sugiyama et al. | |
| 2010/0317815 | A1 | * | 12/2010 | Maeda | C08F 2/00 526/214 |
| 2011/0009569 | A1 | * | 1/2011 | Grootaert | C08F 214/262 525/340 |
| 2012/0053297 | A1 | * | 3/2012 | Nakagawa | C08J 3/12 525/199 |
| 2012/0190796 | A1 | * | 7/2012 | Funaki | C08F 214/18 525/326.2 |
| 2013/0261249 | A1 | * | 10/2013 | Apostolo | C09D 129/10 524/546 |
| 2016/0083489 | A1 | | 3/2016 | Gootaert | |

FOREIGN PATENT DOCUMENTS

| CN | 101925622 | | 12/2010 |
|---|---|---|---|
| EP | 0872495 | | 10/1998 |
| EP | 0937717 | | 8/1999 |
| EP | 1548038 | * | 6/2005 |
| EP | 2239284 | | 10/2010 |
| EP | 2383302 | | 11/2011 |
| EP | 2396353 | | 12/2011 |
| JP | S63-238115 | | 10/1988 |
| JP | 2004-514777 | | 5/2004 |
| JP | 2004-346087 | | 12/2004 |
| JP | 2006-36861 | | 2/2006 |
| WO | WO 97/24381 | | 7/1997 |
| WO | WO 02/44264 | | 6/2002 |
| WO | WO 2008/078738 | | 7/2008 |
| WO | WO 2010-076876 | | 7/2010 |
| WO | WO 2010/082633 | | 7/2010 |
| WO | WO 2012/067936 | * | 5/2012 |
| WO | WO 2014-030586 | | 2/2014 |

OTHER PUBLICATIONS

Shroff, "Assessment of NMR and Rheology for the Characterization of LCB in Essentially Linear Polyethylenes", Macromolecules, 2001, vol. 34, pp. 7362-7367.
Shroff, "Long-Chain-Branching Index for Essentially Linear Polyethylenes" Macromolecules, 1999, vol. 32, pp. 8454-8464.
Sugiyama, Modern Fluoropolymers, pp. 541-555 (1997).
Tuminello, "Dissolving Poly(tetrafluoroethylene) in Low Boiling Halocarbons", Journal of Applied Polymer Science, 1995, vol. 56, pp. 495-499.
International Search Report for PCT International Application No. PCT/US2014/067564, dated Jul. 14, 2015, 5pgs.
(Continued)

*Primary Examiner* — Robert C Boyle
(74) *Attorney, Agent, or Firm* — Julie Lapos-Kuchar

(57) ABSTRACT

Described herein is a peroxide curable, highly fluorinated elastomer derived from tetrafluoroethylene, a perfluoro ether monomer, and a compound selected from at least one of a highly fluorinated bisolefin ether and an iodine-containing perfluorinated ether.

20 Claims, No Drawings

(56) References Cited

OTHER PUBLICATIONS

Brandel et al., Polymers, 2018, v. 10, 1008.
Handbook of Chemistry and Physics, 56$^{th}$ ed., CRC Press, Inc., 1974, pp. F-215 to F-216.

* cited by examiner

HIGHLY FLUORINATED ELASTOMERS

CROSS REFERENCE TO RELATED APPLICATIONS

This application is a national stage filing under 35 U.S.C. 371 of PCT/US2014/067564, filed Nov. 26, 2014, which claims the benefit of U.S. Application No. 61/914,457, filed Dec. 11, 2013, the disclosure of which is incorporated by reference in its/their entirety herein.

TECHNICAL FIELD

A highly fluorinated elastomer composition is described.

BACKGROUND

Perfluoroelastomers (elastomeric perfluoropolymers) exhibit outstanding high temperature tolerance and chemical resistance in both the cured and uncured states. These properties are attributable to the stability and inertness of the copolymerized perfluorinated monomer units which form the major portion of the polymer backbone, e.g. tetrafluoroethylene, perfluoro(methyl vinyl)ether, perfluoro(propyl vinyl)ether and others disclosed in U.S. Pat. Nos. 3,467,638; 3,682,872; 4,035,565; 4,281,092; and 4,972,038. Perfluoroelastomers also, however, necessarily contain small quantities of less stable copolymerized cure site monomers and, in addition, many perfluoroelastomers contain reactive endgroups introduced by the use of chain transfer agents or molecular weight regulators during polymerization. Such moieties must have a high degree of reactivity in order to promote effective crosslinking and cure chemistry, but this reactivity inherently renders the polymers more susceptible to degradative chemical reactions, such as oxidation. Consequently, certain physical properties of the polymer, in particular compression set, and high temperature stress/strain properties, are adversely affected.

Because elastomers can be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation and thermal aging, the initial sealing forces will decay over time. By determining the compression set, elastomeric materials can be evaluated for their sealing force retention under a range of conditions.

SUMMARY

In some embodiments, it is desirable to provide a perfluoroelastomer composition that has good compression set, In one aspect, a composition comprising highly fluorinated elastomer gum is provided derived from:
(a) at least 30 mol % to no more than 80 mol % of tetrafluoroethylene monomer based on total moles of monomer incorporated;
(b) more than 35 mol % and less than 50 mol % of one or more perfluorovinyl ether monomer/perfluoroallylether of the formula (I) based on total moles of monomer incorporated, wherein the perfluoro-vinyl/perfluoro-allyl ether monomer is selected from:

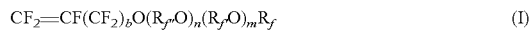

(I)

where $R_{f''}$ and $R_{f'}$ are independently linear or branched perfluoroalkylene radical groups of 2-6 carbon atoms, m and n are independently an integer from 0 to 10 and $R_f$ is a perfluoroalkyl group of 1-6 carbon atoms, b=0 or 1; and
(c) a compound selected from at least one of:
(i) 0.01 to 1.0 mol % of Formula (II) based on total moles of monomer incorporated where Formula (I) is:

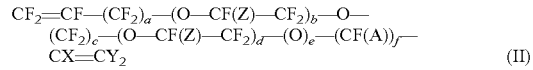

(II)

wherein a is an integer selected from 0-2, b is an integer selected from 0-2, c is an integer selected from 0-8, d is an integer selected from 0-2, e is 0 or 1, f is an integer selected from 0-6; Z is independently selected from F or $CF_3$; A is F or a perfluorinated alkyl group; X is H or F; and Y is independently selected from H, F, and $CF_3$; and/or
(ii) 0.01 to 1 mol % of Formula (III) based on total moles of monomer incorporated where Formula (III) is:

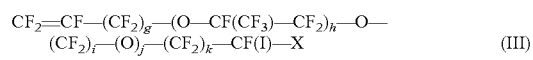

(III)

wherein X is selected from F or $CF_3$; g is 0 or 1; h is an integer selected from 0-3; i is an integer selected from 0-5; j is an integer selected from 0 or 1; and k is an integer selected from 0-6.

In another aspect, there is provided a curable highly fluorinated fluoroelastomer composition comprising the highly fluorinated elastomer gum described above and further comprising a peroxide cure system.

In yet another aspect there is provided a cured highly fluorinated elastomer composition comprising the reaction product of a curing reaction of the highly fluorinated elastomer gum described above and a peroxide cure system.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B);
"backbone" refers to the main continuous chain of the polymer;
"crosslinking" refers to connecting two pre-formed polymer chains using chemical bonds or chemical groups;
"cure site" refers to functional groups, which may participate in crosslinking;
"interpolymerized" refers to monomers that are polymerized together to form a polymer backbone;
"monomer" is a molecule which can undergo polymerization which then form part of the essential structure of a polymer;
"perfluorinated" means a group or a compound derived from a hydrocarbon wherein all hydrogen atoms have been replaced by fluorine atoms. A perfluorinated compound may however still contain other atoms than fluorine and carbon atoms, like oxygen atoms, chlorine atoms, bromine atoms and iodine atoms; and
"polymer" refers to a macrostructure having a number average molecular weight (Mn) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed towards polymerizations of highly fluorinated elastomer gums derived from monomers including, tetrafluoroethylene (TFE), one or more perfluoro ether monomers, and a compound selected from at least one of a highly fluorinated bisolefin ether and an iodine-containing perfluorinated ether. As will be discussed below, the polymerization of a highly fluorinated elastomer described herein can yield a polymer having improved characteristics, such as for example, compression set.

The highly fluorinated elastomer gum of the present disclosure is derived from tetrafluoroethylene (TFE). At least 30 mol % to no more than 80 mol % of TFE based on total moles of monomer incorporated may be used. In some embodiments, at least 30, 40, 60, 62, or even 65 mol % of TFE is used and no more than 70, 75, or even 80 mol % of TFE is used based on the total moles of monomer incorporated into the fluoropolymer.

The highly fluorinated elastomer gum of the present disclosure is also derived from a perfluoro ether monomer, wherein the perfluoro ether monomer is a perfluorovinyl ether monomer, a perfluoroallyl ether monomer, or includes a combination of a perfluorovinyl ether monomer and a perfluoroallyl ether monomer. Such perfluoro ether monomers are of the Formula (I)

$$CF_2=CF(CF_2)_bO(R_{f'}O)_n(R_{f'}O)_mR_f \qquad (I)$$

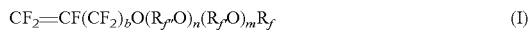

where $R_{f'}$ and $R_f$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms. Examplary perfluorovinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether ($CF_3$—O—$CF_2$—O—CF=$CF_2$), and $CF_3$—$(CF_2)_2$—O—CF($CF_3$)—$CF_2$—O—CF($CF_3$)—$CF_2$—O—CF=$CF_2$, perfluoro (methyl allyl) ether ($CF_2$=CF—$CF_2$—O—$CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3$—$(CF_2)_2$—O—CF($CF_3$)—$CF_2$—O—CF($CF_3$)—$CF_2$—O—$CF_2$CF=$CF_2$, and combinations thereof.

In the present disclosure, more than 35 mol % and less than 50 mol % of the perfluoro ether monomer may be used based on the total moles of monomer incorporated. In some embodiments, at least 36, 37, 38, 39, or even 40 mol % of the perfluoro ether monomer is used and less than 49, 48, 47, 46, or even 45 mol % of the perfluoro ether monomer is used based on the total moles of monomer incorporated into the fluoropolymer.

The highly fluorinated elastomer gum of the present disclosure is further derived from a highly fluorinated bisolefin compound of Formula (II); an iodine-containing perfluorinated ether of Formula (III); or combinations thereof.

The highly fluorinated bisolefin compound of Formula (II), optionally comprises at least one ether linkage is represented by the following formula:

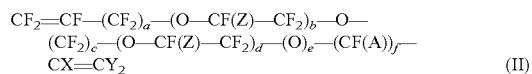

$$CF_2=CF-(CF_2)_a-(O-CF(Z)-CF_2)_b-O-(CF_2)_c-(O-CF(Z)-CF_2)_d-(O)_e-(CF(A))_f-CX=CY_2 \qquad (II)$$

wherein a is an integer selected from 0, 1, and 2; b is an integer selected from 0, 1, and 2; c is an integer selected from 0, 1, 2, 3, 4, 5, 6, 7, and 8; d is an integer selected from 0, 1, and 2; e is 0 or 1; f is an integer selected from 0, 1, 2, 3, 4, 5, and 6; Z is independently selected from F and $CF_3$; A is F or a perfluorinated alkyl group; X is H or F; and Y is independently selected from H, F, and $CF_3$. In a preferred embodiment, the highly fluorinated bisolefin compound of Formula (II) is perfluorinated, meaning that X and Y are independently selected from F, and $CF_3$.

Exemplary compounds of Formula (II) include: $CF_2$=CF—O—$(CF_2)_2$—O—CF=$CF_2$, $CF_2$=CF—O—$(CF_2)_3$—O—CF=$CF_2$, $CF_2$=CF—O—$(CF_2)_4$—O—CF=$CF_2$, $CF_2$=CF—O—$(CF_2)_5$—O—CF=$CF_2$, $CF_2$=CF—O—$(CF_2)_6$—O—CF=$CF_2$, $CF_2$=CF—$CF_2$—O—$(CF_2)_2$—O—CF=$CF_2$, $CF_2$=CF—$CF_2$—O—$(CF_2)_3$—O—CF=$CF_2$, $CF_2$=CF—$CF_2$—O—$(CF_2)_4$—O—CF=$CF_2$, $CF_2$=CF—$CF_2$—O—$(CF_2)_4$—O—CF=$CF_2$, $CF_2$=CF—$CF_2$—O—$(CF_2)_5$—O—CF=$CF_2$, $CF_2$=CF—$CF_2$—O—$(CF_2)_6$—O—CF=$CF_2$, $CF_2$=CF—$CF_2$—O—$(CF_2)_2$—O—$CF_2$—CF=$CF_2$, $CF_2$=CF—$CF_2$—O—$(CF_2)_3$—O—$CF_2$—CF=$CF_2$, $CF_2$=CF—$CF_2$—O—$(CF_2)_4$—O—$CF_2$-CF=$CF_2$, $CF_2$=CF—$CF_2$—O—$(CF_2)_5$—O—$CF_2$—O—CF=$CF_2$, $CF_2$=CF—$CF_2$—O—$(CF_2)_6$—O—$CF_2$—CF=$CF_2$, $CF_2$=CF—O—$CF_2CF_2$—CH=$CH_2$, $CF_2$=CF—(OCF($CF_3$)$CF_2$)—O—$CF_2CH$=$CH_2$, $CF_2$=CF—(OCF($CF_3$)$CF_2$)$_2$—O—$CF_2CF_2$—CH=$CH_2$, $CF_2$=CF—$CF_2$—O—$CF_2CF_2$—CH=$CH_2$, $CF_2$=CF—$CF_2$—(OCF($CF_3$)$CF_2$)—O—$CF_2CF_2$—CH=$CH_2$, $CF_2$=CFCF$_2$—(OCF($CF_3$)$CF_2$)$_2$—O—$CF_2CF_2$—CH=$CH_2$, $CF_2$=CF—$CF_2$—CH=$CH_2$, $CF_2$=CF—O—$(CF_2)_c$—O—$CF_2$—$CF_2$—CH=$CH_2$ wherein c is an integer selected from 2 to 6, $CF_2$=CFCF$_2$—O—$(CF_2)_c$—O—$CF_2$—$CF_2$—CH=$CH_2$ wherein c is an integer selected from 2 to 6, $CF_2$=CF—(OCF($CF_3$)$CF_2$)$_b$—O—CF($CF_3$)—CH=$CH_2$ wherein b is 0, 1, or 2, $CF_2$=CF—$CF_2$—(OCF($CF_3$)$CF_2$)$_b$—O—CF($CF_2$)—CH=$CH_2$ wherein b is 0, 1, or 2, and $CF_2$=CF—$(CF_2)_a$—(O—CF($CF_3$)$CF_2$)$_b$—O—$(CF_2)_c$-(OCF($CF_3$)$CF_2$)$_f$—O—CF=$CF_2$ wherein a is 0 or 1, b is 0, 1, or 2, c is 1, 2, 3, 4, 5, or 6, and f is 0, 1, or 2.

In one embodiment, preferred compound of Formula (II) include: $CF_2$=CF—O—$(CF_2)_N$—O—CF=$CF_2$ where n is an integer from 2-6; $CF_2$=CF—$(CF_2)_a$—O—$(CF_2)_n$—$(CF_2)_b$—CF=$CF_2$ where n is an integer from 2-6 and a and b are 0 or 1; and perfluorinated compounds comprising a perfluorinated vinyl ether and a perfluorinated allyl ether.

In the present disclosure, 0.01 mol % to 1 mol % of a compound of Formula (II) based on total moles of monomer incorporated may be used. In some embodiments, at least 0.02, 0.05, or even 0.1 mol % of a compound of Formula (II) is used and at most 0.5, 0.75, or even 0.9 mol % of a compound of Formula (II) is used based on the total moles of monomer incorporated into the fluoropolymer.

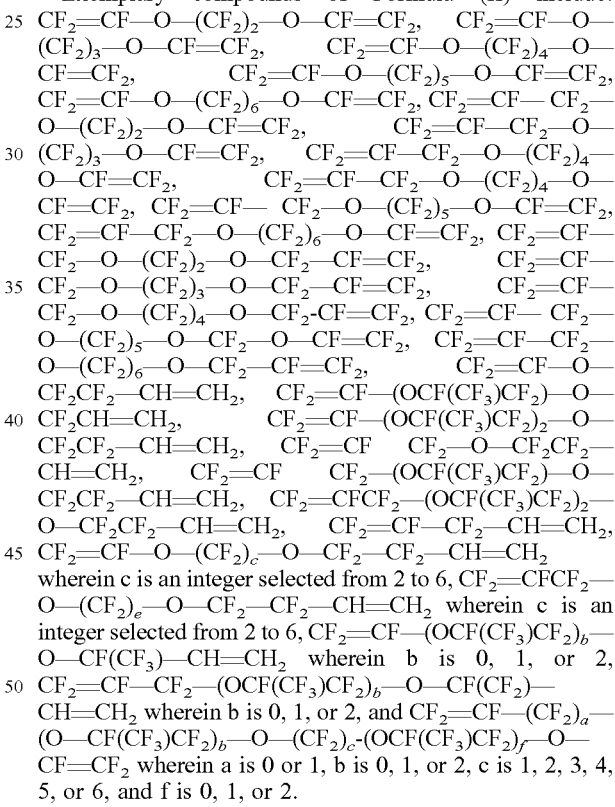

The iodine-containing perfluorinated ether of Formula (III) is represented by the following formula:

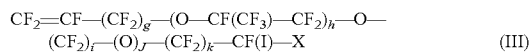  (III)

wherein X is selected from F and $CF_3$; g is 0 or 1; h is an integer selected from 0, 2, and 3; i is an integer selected from 0, 1, 2, 3, 4, and 5; j is 0 or 1; and k is an integer selected from 0, 1, 2, 3, 4, 5, and 6.

Exemplary compounds of Formula (III) include: $CF_2$=$CFOC_4F_8I$ (MV4I), $CF_2$=$CFOC_2F_4I$, $CF_2$=$CFOCF_2CF(CF_3)OC_2F_4I$, $CF_2$=$CF$—($OCF_2CF(CF_3)$)$_2$—$O$—$C_2F_4I$, $CF_2$=$CF$—$O$—$CF_2CFI$—$CF_3$, $CF_2$=$CF$—$O$—$CF(CF_3)$—$O$—$CF_2CFI$—$CF_3$, $CF_2$=$CF$—$O$—$C_2(CF_2)_2$—$O$—$C_2F_4I$, $CF_2$=$CF$—$O$—$(CF_2)_3$—$O$—$C_2F_4I$, $CF_2$=$CF$—$O$—$(CF_2)_4$—$O$—$C_2F_4I$, $CF_2$=$CF$—$O$—$(CF_2)_5$—$O$—$C_2F_4I$, $CF_2$=$CF$—$O$—$(CF_2)_6$—$O$—$C_2F_4$, $CF_2$=$CF$—$CF_2$—$O$—$CF_2$—$O$—$(CF_2)_4C_2F_4I$, $CF_2$=$CF$—$CF_2$—$O$—$(CF_2)_2$—$O$—$C_2F_4I$, $CF_2$=$CF$—$CF_2$—$O$—$(CF_2)_3$—$O$—$C_2F_4I$, $CF_2$=$CF$—$CF_2$—$O$—$(CF_2)_4O$—$C_2F_4I$, $CF_2$=$CF$—$CF_2$—$O$—$CF(_2)_5$—$O$—$C_2F_4I$, $CF_2$=$CF$—$CF_2$—$O$—$(CF_2)_6$—$O$—$C_2F_4I$, $CF_2$=$CF$—$CF_2$—$O$—$C_4F_4I$, $CF_2$=$CF$—$CF_2$—$O$—$C_2F_4I$, $CF_2$=$CF$—$CF_2$—$O$—$CF(CF_3)$—$O$—$C_2F_4I$, $CF_2$=$CF$—$CF_2(OCF_2CF(CF_3))_2$—$O$—$CF_2F_4I$, $CF_2$=$CF$—$CF_2$—$O$—$CFI$—$CF_3$, $CF_2$=$CF$—$CF_2$—$O$—$CF_2CF(CF_3)$—$O$—$CF_2CFI$—$CF_3$, and combinations thereof. In one embodiment, preferred compounds of Formula (III) include: $CF_2$=$CFOC_4F_8I$; $CF_2$=$CFCF_2OC_4F_8I$; $CF_2$=$CFOC_2F_4I$; $CF_2$=$CFCF_2OC_2F_4I$; $CF_2$=$CF$—$O$—$(CF_2)_n$—$O$—$CF_2$—$CF_2I$ and $CF_2$=$CFCF_2$—$O$—$(CF_2)_n$—$O$—$CF_2$—$CF_2I$ wherein n is an integer selected from 2, 3, 4, or 6; and combinations thereof.

In the present disclosure, 0.01 mol % to 1 mol % of a compound of Formula (III) based on total moles of monomer incorporated may be used. In some embodiments, at least 0.02, 0.05, or even 0.1 mol % of a compound Formula (III) is used and at most 0.5, 0.75, or even 0.9 mol % of a compound of Formula (III) is used based on the total moles of monomer incorporated into the fluoropolymer.

When discussing cross-linking of fluoropolymers, bromine or iodine atoms are incorporated into the polymer chain during polymerization to allow for subsequent points for cross-linking. In the present disclosure, iodine atoms are incorporated into the highly fluorinated polymer either through an iodinated chain transfer agent or an iodine-containing cure site monomer, such as those disclosed in Formula (III).

In one embodiment, the highly fluorinated elastomer gum of the present disclosure comprises at least 0.2 or even 0.25 wt %; and up to 0.4, 0.5, or even 1 wt % of iodine versus the total weight of the highly fluorinated elastomer gum. These iodine groups are thought to be either terminal end groups, resulting from an iodinated chain transfer agent and/or end groups from an iodine-containing cure site monomer. These iodine groups may then be used to cross-link the highly fluorinated elastomer gum. In one embodiment, a cure site monomer may not be necessary even when manufacturing fluoroelastomeric compositions. However, in other embodiments, it may be desirable to include cure site monomers to increase the amount of cure sites in the fluoropolymer.

In addition to the monomers described above, additional monomers may optionally be added, such as for example, additional perfluorinated monomers, additional cure site monomers, or specific perfluorinated alkoxy vinylethers for strongly lowering the glass temperature, or other chain transfer agents introducing terminal —I, e.g. I—$(CF_2)_n$, n=1, 2, 3, 4, 5, 6, or 7.

In one embodiment, additional perfluorinated monomers are used in the polymerization. Such additional perfluorinated monomers include perfluorinated alkenes such as hexafluoropropylene (HFP), and perhalogenated alkenes such as chlorotrifluoroethylene (CTFE).

Typically these additional perfluorinated monomers, if used, are used in amounts of at least 1, 2, 5, or even 10 mol % and at most 25, 30, or even 35 mol % based on the total moles of monomer incorporated into the fluoropolymer.

In one embodiment, additional cure site monomers, may be used in the polymerization. Such cure site monomers include those monomers capable of free radical polymerization and comprise an iodine capable of participating in a peroxide cure reaction. Additionally, the additional cure site monomer should be perfluorinated to ensure adequate thermal stability of the resulting elastomer. The iodine atom capable of participating in the peroxide cure reaction is located at a terminal position of the backbone chain. Exemplary additional cure site monomers, aside from those listed in Formula (III), include: $CF_2$=$CFCF_2I$, $CF_2$=$CFI$, and combinations thereof.

Typically these additional monomers, if used, are used in amounts of at least 0.01, 0.02, 0.05, or even 0.1 mol % and at most 0.5, 0.75, 0.9, or even 1 mol % based on the total moles of monomer incorporated into the fluoropolymer.

The highly fluorinated elastomer gums of the present disclosure can be obtained with any of the known polymerization techniques, however, the fluoropolymers are preferably made through an aqueous emulsion polymerization process, which can be conducted in a known manner including batch, semi-batch, or continuous polymerization techniques. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the monomer(s) may be charged to the reactor vessel. The monomers may be charged batchwise or in a continuous or semicontinuous manner By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical. To the aqueous phase there is generally also added a fluorinated surfactant, typically a non-telogenic fluorinated surfactant although aqueous emulsion polymerization without the addition of fluorinated surfactant may also be practiced. Suitable fluorinated surfactants include any fluorinated surfactant commonly employed in aqueous emulsion polymerization. In one embodiment, the fluorinated surfactants are those that correspond to the general formula:

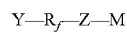

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Exemplary the fluorinated surfactants include: ammonium salts of perfluorinated alkanoic acids, such as perfluorooctanoic acid and perfluorooctane sulphonic acid.

In another embodiment, the fluorinated surfactants are of the general formula:

$$[R_f-O-L-COO^-]_i X_i^+ \qquad (VI)$$

wherein L represents a linear partially or fully fluorinated alkylene group or an aliphatic hydrocarbon group, $R_f$ represents a linear partially or fully fluorinated aliphatic group or a linear partially or fully fluorinated group interrupted with one or more oxygen atoms, $X_i^+$ represents a cation having the valence i and i is 1, 2 and 3. Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts. In one embodiment, the molecular weight of the surfactant is less than 1500, 1000, or even 500 grams/mole.

These fluorinated surfactants may be used alone or in combination as a mixture of two or more of them. The amount of the surfactant is generally within a range of 250 to 5,000 ppm (parts per million), preferably 250 to 2000 ppm, more preferably 300 to 1000 ppm, based on the mass of water to be used.

A chain transfer agent may be used to control the molecular weight of the fluoropolymer so as to obtain the desired zero shear rate viscosity and/or to introduce halogens (I or Br) at a terminal position of the polymer chain. Examples of suitable chain transfer agents include those having the formula $R_f P_x$, wherein P is Br or I, preferably I, $R_f$ is an x-valent alkyl radical having from 1 to 12 carbon atoms, which, optionally may also contain chlorine atoms. Typically, x is 1 or 2. Useful chain transfer agents include perfluorinated alkyl monoiodide, perfluorinated alkyl diiodide, perfluorinated alkyl monobromide, perfluorinated alkyl dibromide, perfluorinated alkyl monobromide monoiodide, and combinations thereof. Specific examples include $CF_2Br_2$, $Br(CF_2)_2Br$, $Br(CF_2)_4Br$, $CF_2ClBr$, $CF_3CFBrCF_2Br$, $I(CF_2)_nI$ wherein n is an integer from 1-10 (e.g., $I(CF_2)_4I$), $Br(CF_2)_nI$ wherein n is an integer from 1-10 (e.g., $Br(CF_2)_2I$), and combinations thereof.

The polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert-butylperoxyacetate and tert-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium- alkali- or earth alkali salts of persulfates, permanganic or manganic acid or manganic acids. The amount of initiator employed is typically between 0.001 and 2% by weight, preferably between 0.01 and 1% by weight, most preferably between 0.02 and 0.2% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may be added.

During the initiation of the polymerization reaction, the sealed reactor kettle and its contents are conveniently preheated to the reaction temperature. Polymerization temperatures are from 20° C. to 150° C., from 30° C. to 110° C., or even from 40° C. to 100° C. In one embodiment, a temperature range from 70 to 90° C. may be preferred to optimize the polymerization run time while achieving low carbonyl content. The polymerization pressure is typically between 4 and 30 bar, in particular 8 to 20 bar. The aqueous emulsion polymerization system may further comprise auxiliaries, such as buffers and complex-formers.

The amount of polymer solids that can be obtained at the end of the polymerization is typically between 10% and 45% by weight, preferably between 20% and 40% by weight and the average particle size of the resulting fluoropolymer is typically between 50 nm and 500 nm, preferably between 80 nm to 250 nm.

It has been discovered that the by using specific combinations of monomers and polymerization conditions, highly fluorinated elastomer gums may be achieved having beneficial results. For example, it has been found, that the use of specific monomers and polymerization conditions result in a highly fluorinated elastomer composition having particularly good compression set. Unlike U.S. Pat. No. 4,910,276, the fluoropolymers of the present disclosure do not comprise a substantial cyclic structure in the main polymer chain. Instead, it is believed that the use of perfluorinated monomers of Formula (II) and/or (III) disclosed herein do not contain C—H bonds and therefore do not act as additional chain transfer agents nor introduce weak points (i.e., C—H bonds) within the carbon chain. Furthermore, the use of perfluorinated monomers of Formula (II) and/or (III) may also result in low integrated absorbance ratios as a result of using lower amounts of initiator (e.g., less than 10 mmol/kg polymer). These features may result in better product performance of the resulting fluoropolymer (e.g. low compression sets, lower amounts of ion content, better thermostability, etc.)

In one embodiment, the highly fluorinated elastomer gum has a low presence of carbonyl content.

The carbonyl content of the highly fluorinated elastomer gum may be determined by an integrated absorbance ratio method based on Fourier transform infrared analysis (FTIR).

This method may also be used to determine the carboxyl, carboxylate, and carboxamide groups and relies on the baseline corrected integrated absorption underneath prominent peaks in the FT-IR spectrum of a pressed film of the highly fluorinated elastomer gum. In particular, the integrated absorbance of the most prominent peaks between approximately 1620 $cm^{-1}$ to 1840 $cm^{-1}$ are measured. These peaks correspond to absorbances attributable to carbonyl moieties present in the polymer. This baseline corrected integrated absorbance under the most intense peaks within the range of 1620 $cm^{-1}$ and 1840 $cm^{-1}$ is divided by the baseline corrected integrated absorbance of the C—F stretch overtone between 2220 cm$^{-1}$, and 2740 cm$^{-1}$, which is indicative of the thickness of the sample. This gives the carbonyl absorbance ratio which characterizes the carboxyl, carboxylate, and carboxamide content of the polymer. The polymers useful in this disclosure have an integrated absorbance ratio less than 0.07, less than 0.04, or even less than 0.03. Such measurement techniques are described in U.S. Pat. No. 6,114,452 (Schmiegel) and U.S. Pat. No. 8,604,137 (Grootaet et al.), herein incorporated by reference.

The presence of acidic end-groups is known to be detrimental to certain properties of the fluoropolymer. Thus, heating techniques have previously been used to convert carboxylate end groups to non-ionic end groups. Although these carboxylate end groups are converted to non-ionic acid fluoride end groups, these acid fluoride end groups can be slowly hydrolyzed by ambient water in the environment and as such are converted back to carboxyl end groups. Thus, although a fluoropolymer may have a low integrated absorbance ratio after a heat treatment, over time the integrated absorbance ratio can increase. Because of the monomers selected and the polymerization methods employed, the fluoroelastomers of the present disclosure in one embodiment have a minimal amount of ionic end groups and thus, they do not require a heat treatment step to achieve the low integrated absorbance ratio disclosed herein.

It is believed that in one embodiment, the highly fluorinated elastomer gums have a polymer architecture that favorably influences the mechanical properties and/or the curing behavior of the highly fluorinated elastomer by generating branched polymers, particularly when used in small amounts.

The level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa·s) of the branched polymer measured at a temperature T and $[\eta]_{br}$ is the intrinsic viscosity (units ml/g) of the branched polymer at a temperature T' in a solvent in which the branched polymer can be dissolved and a and k are constants. These constants are determined from the following equation:

$$\eta_{0,lin} = k \cdot [\eta]_{lin}^{a} \qquad \text{eq. 2}$$

wherein $\eta_{0,lin}$ and $[\eta]_{lin}$ represent respectively the zero shear viscosity and intrinsic viscosity of the corresponding linear polymer measured at the respective same temperatures T and T' and in the same solvent. Thus, the LCBI is independent of the selection of the measurement temperatures and solvent chosen provided of course that the same solvent and temperatures are used in equations 1 and 2. The zero shear viscosity and intrinsic viscosity are typically determined on freeze coagulated polymers.

The determination of the intrinsic viscosity of the branched polymer $[\eta]_{br}$ requires that the polymer is readily soluble in an organic solvent. Highly fluorinated polymers are, due to their chemical inertness, usually insoluble in standard organic solvents such as acetone, ethyl acetate or tetrahydrofurane. Typically, only a few organic liquids are capable to dissolve highly fluorinated polymers. As disclosed by Tuminello et al. in Journal of Applied Polymer Science (1995), Volume 56, Issue 4, p. 495-499 ("Dissolving Poly(tetrafluoroethylene) in Low Boiling Halocarbons"), perhalocarbons are capable to dissolve highly fluorinated polymers. Moreover, perfluorinated solvents such as perfluoro(butyltetrahydrofurane) (available under the trade designation "FLUORINERT FC-75" available from 3M Company) or perfluorinated polyethers such as perfluoro-5,8,9, 12-tetramethyl-4,7,10,13-tetraoxahexadecane (Hostinert-216), or HFPO oligomers of the general formula $CF_3CF_2CF_2O[CF(CF_3)CF_2O]_nCFHCF_3$, with $2 \leq n \leq 4$, are in particular suitable to dissolve the highly fluorinated elastomers of the present disclosure under convenient laboratory conditions. For example, the amorphous copolymers derived from tetrafluoroethylene and perfluoro ether monomer of the present disclosure can be readily dissolved in Hostinert-216 at 35° C.

The LCBI of the fluoropolymer used should have a value of at least 0.2. However, when the level of branching (and thus the LCBI value) becomes too large, the polymer may have a gel fraction that cannot be dissolved in an organic solvent. One skilled in the art through routine experimentation may readily determine the appropriate value of LCBI. Generally, the LCBI will be between 0.2 and 5, preferably between 0.5 and 1.5. In one embodiment, the LCBI is greater than 0.2, 0.5, 1, 1.5, 2, 2.5, 4, or even 6.

In one embodiment of the present disclosure, the compositions of the present disclosure comprise a higher LCBI value, than the same polymer prepared with an alternate branching agent, such as a halogenated olefin.

The elastomers provided herein are highly fluorinated. In other words, all of the C—H bonds in the polymer backbone are replaced by C—F bond, although the end groups may or may not be fluorinated. In one embodiment, the polymer of the present disclosure are highly fluorinated meaning that 80%, 90%, 95%, 99% or even 100% of the C—H bonds in the polymer backbone are replaced by C—F or C—I bonds. The fluoroelastomer gums may be cured (cross-linked) or uncured (non-crosslinked). Typically, fluoroelastomer are amorphous. Typically they do not have a melting peak. Generally, they have a glass transition temperature (Tg) of up to 25° C. polymers, and preferably below 0° C.

The highly fluorinated elastomer gum described above may be used to make curable highly fluorinated elastomer compositions. The curable highly fluorinated elastomer compositions contain curable highly fluorinated elastomer gums and one or more peroxide cure systems. The peroxide cure systems typically include an organic peroxide. The peroxide will cause curing of the highly fluorinated elastomer to form a cross-linked (cured) fluoroelastomer when activated. Suitable organic peroxides are those which generate free radicals at curing temperatures. A dialkyl peroxide or a WO 2015/088784 PCT/US2014/067564 bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha, alpha'-bis(t-butylperoxy-diisopropylbenzene), and di[1,3-dimethyl-3-(t-butylperoxy)-butyl]carbonate. Generally, about 1 to 5 parts of peroxide per 100 parts of highly fluorinated elastomer may be used.

The curing agents may be present on carriers, for example silica containing carriers.

A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl inalonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate.

The curable highly fluorinated elastomer composition may further contain acid acceptors. Acid acceptors may be added to improve the fluoroelastomers steam and water resistance. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used.

In one embodiment, an acid acceptor is used between 0.5 and 5 parts per 100 parts of highly fluorinated elastomer. In one embodiment of the present disclosure, an acid acceptor is not needed and the highly fluorinated elastomer composition is essentially free an acid acceptor. In one embodiment of the present disclosure, a metal-containing acid acceptor is not needed and the curable highly fluorinated elastomer composition is essentially free of a metal-containing acid acceptor. As used herein, essentially free of an acid acceptor or essentially free of a metal-containing acid acceptor means less than 0.01, 0.005, or even 0.001 parts per 100 parts of the highly fluorinated elastomer or even none present.

The curable highly fluorinated elastomer compositions may be prepared by mixing the highly fluorinated elastomer, a peroxide cure composition and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding" Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

The Mooney viscosity of a fluoropolymer can be an indication of the molecular weight of the polymer. In one embodiment, the fluoropolymers of the present disclosure, have a Mooney viscosity (ML 1+10) at 121° C. of 5-100, preferably 15-80, and more preferably 20-60 when measured in a manner similar to that disclosed in ASTM D 1646-06.

Curing is typically achieved by heat-treating the curable highly fluorinated elastomer composition. The heat-treatment is carried out at an effective temperature and effective time to create a cured fluoroelastomer. Optimum conditions can be tested by examining the cured highly fluorinated elastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours.

The cured highly fluorinated elastomers are particularly useful as seals, gaskets, and molded parts in systems that are exposed to elevated temperatures and/or corrosive materials, such as in automotive, chemical processing, semiconductor, aerospace, and petroleum industry applications, among others. Because the cured highly fluorinated elastomers may be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation, and thermal aging, the initial sealing forces will decay over time. By determining the compression set, elastomeric materials can be evaluated for their sealing force retention under a range of conditions, particularly under high temperature conditions, such as 200° C., 225° C., 232° C., 250° C., and even 275° C.

The cured highly fluorinated elastomers may be used to prepare shaped articles. Such articles may be prepared by providing a curable highly fluorinated elastomer composition and adding further ingredients such as filler, pigments, plasticizers, lubricants and the like to the curable composition. Typical fillers include, for example, silica containing materials or carbon particles like carbon blacks, graphite, soot and the like. Alternatively, the ingredients may already be added in the compounding step and are introduced into the compound. Shaping the composition into a shaped article may be carried out, for example, by curing the composition in shaped molds or by shaping cured composition by means known in the art, for example by cutting, die cutting, and the like.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials were obtained or are available, from general chemical suppliers such as, for example, Sigma-Aldrich Company, Saint Louis, Mo., or Anles, St. Petersburg, Russia, or may be synthesized by conventional methods.

These abbreviations are used in the following examples: phr=parts per hundred rubber; g=grams, min=minutes, mol=mole; mmol=millimole, hr or h=hour, °C.=degrees Celsius, mL=milliliter, L=liter, psi=pounds per square inch, psig=pounds per square inch gauge; MPa=Mega-Pascals, GCMS=gas chromatography mass spectroscopy, FNMR=Fourier transform nuclear magnetic resonance, and N-m=Newton-meter.

Determination of iodine content: The iodine content was determined by elemental analysis using an ASC-240 S auto sampler from Enviroscience (Düsseldorf/Germany), an Enviroscience AQF-2100 F combustion unit (software: "NSX-2100, version 1.9.8"; Mitsubishi Chemical Analytech Co., LTD.) an Enviroscience GA-210 gas absorption unit and a Metrohm "881 compac IC pro" liquid chromatography analyzer (software: Metrohm "Magic IC Net 2.3", Riverview, Fla.). The iodine content is reported as the wt % versus the weight of the fluoropolymer.

Determination of average particle size: The latex particle size was determined by dynamic light scattering with a Malvern Zetasizer 1000 HAS in accordance to ISO/DIS 13321. Prior to measurements, the polymer latices were diluted with 0.001 mol/L KCl-solution; the measurement temperature was 25° C. The reported average value is the Z-average particle diameter (median particle size, $d_{50}$).

Determination of polymer composition: $^{19}$F nuclear magnetic resonance (NMR) spectra were recorded with a Bruker Avance 400 (400.13 MHz) instrument (Billerica, Mass.). The polymers were dissolved in acetone-d6 at a concentration of typically 50 mg/ml, 3000 scans per measurement were usually applied.

Integrated absorbance ratio method: The integrated absorbance ratio was determined by calculating the ratio of the integrated peak intensity within the range of 1620-1840 $cm^{-1}$ to that within the range of 2220-2740 $cm^{-1}$, as measured on a Fourier transform infrared spectrometer.

Mooney viscosity method: The Mooney viscosity values were measured in a similar manner as ASTM D 1646-06 Type A by a MV2000 instrument (available from Alpha Technologies, Ohio) using large rotor (ML 1+10) at 121° C. Results are reported in Mooney units.

Comparative Example 1 (CE-1)

Under oxygen-free condition a 4 liter kettle was charged with 2500 mL deionized water and 20 g $CF_3$—O—$(CF_2)_3$—O—CFH—$CF_2$—$COONH_4$ (prepared as in "Preparation of Compound 11" in U.S. Pat. No. 7,671,112) was added as emulsifier. After heating to 80° C., 95 g tetrafluoroethene (TFE), 700 g perfluoromethylvinylether (PMVE), and 7 g 1,4-diiodooctafluorobutane were added. The reaction was initiated with addition of 0.5 g ammonium peroxodisulphate (APS) dissolved in 20 mL deionized water by continuously feeding. At 17 bar pressure and 80° C., 600 g TFE, 540 g PMVE were fed over a period of 330 min. The resulting latex had a solid content of 30% and was coagulated using $MgCl_2$. The resulting 1.1 kg polymer was dried at 120° C.

The composition of the resulting polymer was 61 mole % TFE and 39 mole % PMVE based on NMR (nuclear magnetic resonance), with 0.2 wt % iodine based on ion chromatography. The resulting polymer has an integrated absorbance ratio of 0.014 and Mooney-Viscosity (1+10', 121° C.) of 19.

Example 2

The sample was made, coagulated and dried as described in Example 1 but only 4 g of 1,4-diiodooctafluorobutane was added and 7.3 g of perfluoro-[(6-iodo-4-oxa-hexyl)-vinyl]-ether (MV32-I) was also added to the polymerization.

The composition of the resulting polymer was 61 mole % TFE and 39 mole % PMVE based on NMR, with 0.2 wt % iodine based on ion chromatography. The iodine is resulting from the iodine-containing chain transfer agent and/or the iodine-containing cure site monomer (CSM). The calculated amount of the iodinated CSM MV32-I is 0.09 mole %, which corresponds to 0.1 wt % iodine versus total fluoropolymer. The resulting polymer has an integrated absorbance ratio of 0.04 and Mooney-Viscosity (1+10', 121° C.) of 65.

Example 3

Under oxygen-free condition a 40 liter kettle was charged with 28 L deionized water. 220 g $CF_3$—O—$(CF_2)_3$—O—CFH—$CF_2$—$COONH_4$ was added as emulsifier. After heating to 90° C., 590 g tetrafluoroethene (TFE), 1740 g perfluoromethylvinylether (PMVE), and 48 g 1,4-diiodooctafluorobutane were added. The reaction was initiated with addition of 3.5 g ammonium peroxodisulphate (APS) dissolved in 290 mL deionized water by continuously feeding. At 17 bar pressure and 90° C., 4500 g TFE, 4090 g PMVE, 54 g perfluoro-[(6-iodo-4-oxa-hexyl)-vinyl]-ether (MV32-I), and additionally 4.1 g of APS dissolved in 340 g deionized water were fed over a period of 380 min. The resulting latex had a solid content of 23% and was coagulated using $MgSO_4$. The resulting 8.6 kg polymer was dried at 120° C.

The composition of the resulting polymer was 67.6 mole % TFE and 32.4 mole % PMVE based on NMR with 0.4 wt % iodine based on ion chromatography. The iodine is resulting from the iodine-containing chain transfer agent and/or the iodine-containing cure site monomer (CSM). The calculated amount of the iodinated CSM MV32-I is 0.13 mole %, which corresponds to 0.13 wt % iodine The resulting polymer has an integrated absorbance ratio of 0.05 and a Mooney-Viscosity (1+10', 121° C.) of 16.

Example 4

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C., 650 g tetrafluoroethene (TFE), 1920 g perfluoromethylvinylether (PMVE), and 45 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 6500 g TFE, 5920 g PMVE, and 78 g perfluoro-[(6-iodo-4-oxa-hexyl)-vinyl]-ether (MV32-I) were fed over a period of 190 min. The resulting latex had a solid content of 30% and was coagulated using $MgSO_4$. The resulting 12 kg polymer was dried at 120° C.

The composition of the resulting polymer was 66.4 mole % TFE and 33.6 mole % PMVE based on NMR with 0.33 wt % iodine based on ion chromatography. The iodine is resulting from the iodine-containing chain transfer agent and/or the iodine-containing cure site monomer (CSM). The calculated amount of the iodinated CSM MV32-I is 0.13 mole %, which corresponds to 0.13 wt % iodine. The resulting polymer has an integrated absorbance ratio of 0.031 and a Mooney-Viscosity (1+10', 121° C.) of 56.

Example 5

Under oxygen-free condition a 40 Liter kettle was charged with 28 L deionized water. 180 g $CF_3$—O—

$(CF_2)_3$—O—CFH—$CF_2$—$COONH_4$ was added as emulsifier. After heating to 80° C. 650 g tetrafluoroethene (TFE), 1960 g perfluoromethylvinylether (PMVE), and 58 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 6500 g TFE, 5910 g PMVE, and 64 g perfluoro-[(6-iodo-4-oxa-hexyl)-vinyl]-ether (MV32-I) were fed over a period of 215 min. The resulting latex had an average particle size of 93 nm and a solid content of 30% and was coagulated using $MgSO_4$. The resulting 12 kg polymer was dried at 120° C.

The composition of the resulting polymer was 67.1 mole % TFE and 32.9 mole % PMVE based on NMR with 0.34 wt % iodine based on ion chromatography. The iodine is resulting from the iodine-containing chain transfer agent and/or the iodine-containing cure site monomer (CSM). The calculated amount of the iodinated CSM MV32-I is 0.11 mole %, which corresponds to 0.11 wt % iodine. The resulting polymer has an integrated absorbance ratio of 0.033 and Mooney-Viscosity (1+10', 121° C.) of 36.

Example 6

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C., 570 g tetrafluoroethene (TFE), 2160 g perfluoromethylvinylether (PMVE), and 43 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 5850 g TFE, 6560 g PMVE, and 64 g perfluoro-[(6-iodo-4-oxa-hexyl)-vinyl]-ether (MV32-I) were fed over a period of 185 min. The resulting latex had a solid content of 30% and was coagulated using $MgSO_4$. The resulting 12 kg polymer was dried at 120° C.

The composition of the resulting polymer was 62.3 mole % TFE and 37.7 mole % PMVE based on NMR with 0.37 wt % iodine based on ion chromatography. The iodine is resulting from the iodine-containing chain transfer agent and/or the iodine-containing cure site monomer (CSM). The calculated amount of the iodinated CSM MV32-I is 0.11 mole %, which corresponds to 0.13 wt % iodine. The resulting polymer has an integrated absorbance ratio of 0.047 and a Mooney-Viscosity (1+10', 121° C.) of 36.

Example 7

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C., 660 g tetrafluoroethene (TFE), 1990 g perfluoromethylvinylether (PMVE), and 78 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 2590 g TFE, 2460 g PMVE, and 13.4 g 3,7-dioxa-dodecafluoronona-1,8-diene (DVE-3) were fed over a period of 113 min. The resulting latex had a solid content of 15% and was coagulated using $MgSO_4$. The resulting 5 kg polymer was dried at 120° C.

The composition of the resulting polymer was 67.4 mole % TFE and 32.6 mole % PMVE based on NMR with 0.69 wt % iodine based on ion chromatography. The resulting polymer has an integrated absorbance ratio of 0.052 and a Mooney-Viscosity (1+10', 121° C.) was 1.

Example 8

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C. 650 g tetrafluoroethene (TFE), 1960 g perfluoromethylvinylether (PMVE), and 79 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 6500 g TFE, 5900 g PMVE, and 34 g 3,7-dioxa-dodecafluoronona-1,8-diene (DVE-3) were fed over a period of 174 min. The resulting latex had a solid content of 31% and was coagulated using $MgSO_4$. The resulting 13 kg polymer was dried at 120° C.

The composition of the resulting polymer was 64.5 mole % TFE and 35.5 mole % PMVE based on NMR with 0.32 wt % iodine based on ion chromatography. The resulting polymer has an integrated absorbance ratio of 0.036 and a Mooney-Viscosity (1+10', 121° C.) was 50.

Compound Formulation

As described in the following, the polymers of each sample (CE 1 and Ex 2-Ex 8) were press-cured using a peroxide cure package and various physical properties were measured. In each case, 100 parts of the polymer from the examples above were mixed on a two roll mill with 25 parts carbon black N-990 available under the trade designation "THERMAX FLOFORM MEDIUM THERMAL CARBON BLACK N990", ASTM N990 from Cancarb Ltd., Medicine Hat, Alberta, Canada, 2.5 parts peroxide sold under the trade designation "TRIGONOX 101-50 pd", AkzoNobel Polymer Chemicals LLC, Chicago, IL, and 3 parts of TALC, triallylisocyanurate (70%) available under the trade designation "TAIC" from Nippon Kasei, Japan. To each sample 5 parts ZnO (available from Lanxess, Leverkusen, Germany) was added and is designated below with the letter A. In some samples, no ZnO was added and these samples are designated with the letter B.

Press-Cure: 150×100×2.0 mm sheets were prepared for physical property determination by pressing at about 10 MegaPascals (MPa) for 7 minutes at 177° C.

Post-Cure: the press-cured sheets were post-cured by exposure to heat for 16 h at 230° C. in an oven.

Cure rheology: tests were carried out using uncured, compounded samples using a rheometer (e.g. Rubber Process Analyzer (RPA) Model 2000 from Alpha Technologies) in accordance with ASTM D 5289 at 177° C., no pre-heat, 12 minute elapsed time, and a 0.5 degree arc, 100 cycles per minute). Both the minimum torque ($M_L$) and highest torque attained during a specified period of time when no plateau or maximum torque was obtained ($M_H$) were measured. Also measured were the time for the torque to increase 2 units above $M_L$ ($t_s2$), the time for the torque to reach a value equal to $M_L$+0.5 ($M_H$-$M_L$), (t'50), and the time for the torque to reach $M_L$+0.9 ($M_H$-$M_L$), (t'90). Results are reported in Tables 1A and 1B.

TABLE 1A

|  | CE1 | | Ex 2 | | Ex 3 | Ex 4 |
| --- | --- | --- | --- | --- | --- | --- |
| Sample | A | B | A | B | A | A |
| $M_L$ [in-lb] | 0.6 | 0.3 | 3.3 | 2 | 0.72 | 2.39 |
| $M_H$ [in-lb] | 30.2 | 27 | 29.41 | 25.9 | 35.1 | 33.67 |
| Tan δ at $M_L$ | 2.445 | 3.831 | 0.733 | 0.894 | 1.628 | 0.774 |
| Tan δ at $M_H$ | 0.059 | 0.057 | 0.076 | 0.061 | 0.073 | 0.064 |

TABLE 1A-continued

|  | CE1 | | Ex 2 | | Ex 3 | Ex 4 |
|---|---|---|---|---|---|---|
| Sample | A | B | A | B | A | A |
| ts2, [min] | 0.3 | 0.3 | 0.3 | 0.3 | 0.27 | 0.27 |
| t'50, [min] | 0.4 | 0.4 | 0.4 | 0.4 | 0.36 | 0.37 |
| t'90, [min] | 0.6 | 0.6 | 0.6 | 0.6 | 0.51 | 0.54 |

TABLE 1B

| | Sample | | | |
|---|---|---|---|---|
| | Ex 5 A | Ex 6 A | Ex 7 A | Ex 8 A |
| $M_L$ [in-lb] | 1.38 | 1.19 | 0.04 | 2.6 |
| $M_H$ [in-lb] | 34.13 | 33.6 | 40.92 | 38.1 |
| Tan δ at $M_L$ | 1.099 | 1.159 | 3.992 | 0.856 |
| Tan δ at $M_H$ | 0.063 | 0.057 | 0.06 | 0.05 |
| ts2, [min] | 0.27 | 0.28 | 0.29 | 0.27 |
| t'50, [min] | 0.36 | 0.38 | 0.39 | 0.4 |
| t'90, [min] | 0.54 | 0.56 | 0.57 | 0.65 |

Post-cured sheets (procedure see above) of the curable composition were used for physical property determination. All specimens were returned to ambient temperature before testing.

Physical Properties

Tensile strength at break, elongation at break, and modulus at 100% elongation were determined according to ASTM D 412 using samples cut from the corresponding post-cured sheets using punch Die D according to ASTM D 412.

Shore A Hardness was measured using ISO 7619-1 with a Type A-2 Shore Durometer.

O-Ring Molding and Compression Set

O-rings having a cross-section thickness of 0.139 inch (3.5 mm) were molded (12 min cure at 177° C.) from compounded sample followed by a postcure in air for 16 hrs at 230° C. The O-rings were subjected to compression set testing following a similar method as described in ASTM 395-89 method B (analyzed in triplicate), with 25% initial deflection at variable time and temperature as per Tables 2A and 2B.

Shown in Tables 2A and 2B below are the physical properties and compression sets for each of the samples.

TABLE 2A

| | CE1 | | Ex 2 | | Ex 3 | Ex 4 |
|---|---|---|---|---|---|---|
| Sample | A | B | A | B | A | A |
| Tensile Strength at Break in MPa | 19 | 15.9 | 16.8 | 15.6 | 22.7 | 21.8 |
| Elongation at Break, % | 178 | 181 | 147 | 165 | 125 | 127 |
| Modulus @ 100% Elongation in MPa | 8 | 7 | 9.3 | 8.1 | 18.2 | 16.9 |
| Shore A Hardness | 74 | 76 | 75 | 76 | 82 | 81 |
| Compression Set O-Ring 70 h at 232° C. | 37 | 53 | 33 | 43 | n.m. | n.m. |
| Compression Set O-Ring 70 h at 200° C. | 20 | 23 | 15 | 19 | 19 | 17 | n.m.: not measured

TABLE 2B

| | Sample | | | |
|---|---|---|---|---|
| | Ex 5 A | Ex 6 A | Ex 7 A | Ex 8 A |
| Tensile Strength at Break in MPa | 21.3 | 17.3 | 19.8 | 25.2 |
| Elongation at Break, % | 127 | 116 | 111 | 132 |
| Modulus @ 100% Elongation in MPa | 16.4 | 14.4 | 17.6 | 18.8 |
| Shore A Hardness | 82 | 77 | 84 | 85 |
| Compression Set O-Ring 70 h at 232° C. | 29 | 32 | 47 | 32 |
| Compression Set O-Ring 70 h at 200° C. | 17 | 12 | 19 | 13 |

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A curable composition comprising a curing system, wherein the curing system consists of a highly fluorinated polymer, a peroxide and coagent, and wherein the highly fluorinated polymer is derived from:
    (a) at least 50 mol % to no more than 65 mol % of tetrafluoroethylene monomer based on total moles of monomer incorporated;
    (b) more than 35 mol % to less than 50 mol % of perfluoro (methyl vinyl) ether; and
    (c) 0.01 to 1 mol % of Formula III based on total moles of monomer incorporated where Formula (III) is:

$$CF_2\!\!=\!\!CF\!\!-\!\!(CF_2)_g\!\!-\!\!(O\!\!-\!\!CF(CF_3)\!\!-\!\!CF_2)_h\!\!-\!\!O\!\!-\!\!(CF_2)_i\!\!-\!\!(O)_j\!\!-\!\!(CF_2)_k\!\!-\!\!CF(I)\!\!-\!\!X \quad (III)$$

wherein X is selected from F or $CF_3$; g is 0; h is 0 i is an integer selected from 1-5; j is an integer selected from 0 or 1; and k is an integer selected from 0-6, wherein at least 95% of the C—H bonds in the backbone of the highly fluorinated polymer are replaced by C—F or C—I bonds.

2. A cured fluoroelastomer composition comprising the reaction product of a curing reaction of the curable composition according to claim 1.

3. A shaped article comprising the cured fluoroelastomer composition according claim 2.

4. The curable composition of claim 1, wherein the highly fluorinated polymer has an integrated absorbance ratio is less than 0.1, the integrated absorbance ratio being determined by calculating the ratio of the integrated peak intensity within the range of 1620-1840 cm$^{-1}$ to that within the range of 2220-2740 cm$^{-1}$, as measured by Fourier transform infrared analysis.

5. The curable composition of claim 1, wherein the compound of Formula (III) is selected from at least one of: $CF_2\!\!=\!\!CFOC_4F_8I$ (MV4I), $CF_2\!\!=\!\!CFOCF_2CF_2CF_2\!\!-\!\!O\!\!-\!\!C_2F_4I$, and $CF_2\!\!=\!\!CFOC_2F_4I$.

6. The curable composition of claim 1, wherein the highly fluorinated polymer is further derived from (d) an additional perfluorinated monomer selected from at least one of HFP and CTFE.

7. The curable composition of claim 1, wherein the highly fluorinated polymer is further derived from (e) an additional cure site monomer.

8. The curable composition of claim 7, wherein the additional cure site monomer is I—CF=CF$_2$.

9. The curable composition of claim 1, wherein the highly fluorinated polymer is derived from: (a) at least 60 mol % to no more than 65 mol % of tetrafluoroethylene monomer based on total moles of monomer incorporated.

10. The curable composition of claim 1, wherein the coagent comprises at least one of: triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraallyl inalonamide; trivinyl isocyanurate; 2,4,6-trivinyl methyltrisiloxane; N,N'-m-phenylenebismaleimide; diallylphthalate and tri(5-norbornene-2-methyl ene)cyanurate.

11. The curable composition of claim 1, wherein the composition further comprises an acid acceptor.

12. The curable composition of claim 11, wherein the acid acceptor comprises at least one of magnesium oxide, calcium oxide, calcium hydroxide, zinc oxide, calcium carbonate, hydrotalcite, and magnesium oxalate.

13. The curable composition of claim 1, wherein the highly fluorinated polymer comprises at least 0.2 wt % of iodine versus the total weight of the highly fluorinated polymer.

14. The curable composition of claim 1, wherein the highly fluorinated polymer is perfluorinated.

15. The curable composition of claim 1, wherein for the compound of Formula (III) j is 1.

16. The curable composition of claim 1, wherein the highly fluorinated polymer comprises at most 0.9 wt % of iodine versus the total weight of the highly fluorinated polymer.

17. The curable composition of claim 1, wherein the curable composition further comprises at least one of a filler, a plasticizer, a pigment, and a lubricant.

18. The curable composition of claim 1, wherein the highly fluorinated polymer has a Mooney viscosity (ML 1+10) at 121° C. of 15-80.

19. The curable composition of claim 1, wherein the highly fluorinated polymer consists of the following interpolymerized monomers: tetrafluoroethylene, perfluoro (methyl vinyl) ether; and the monomer according to formula (III).

20. The curable composition of claim 1, wherein the compound of Formula (III) is selected from at least one of: $CF_2=CFOC_4F_8I$ (MV4I), $CF_2=CFOCF_2CF_2CF_2-O-C_2F_4I$.

* * * * *

UNITED STATES PATENT AND TRADEMARK OFFICE
CERTIFICATE OF CORRECTION

PATENT NO. : 11,111,326 B2
APPLICATION NO. : 15/036824
DATED : September 7, 2021
INVENTOR(S) : Klaus Hintzer It is certified that error appears in the above-identified patent and that said Letters Patent is hereby corrected as shown below:

In the Claims

Column 18
Line 33, Claim 1, insert -- ; -- after "h is 0".
Line 45, Claim 4, delete "is" and insert -- of --, therefor.

Column 19
Line 21, Claim 15, insert -- , -- after "Formula (III)".

Column 20
Line 15-16, Claim 19, delete "formula (III)" and insert -- Formula (III) --, therefor.
Line 19, Claim 20, insert -- and -- after "$CF_2=CFOC_4F_8$)I (MV4I),".

Signed and Sealed this
Nineteenth Day of July, 2022

Katherine Kelly Vidal
*Director of the United States Patent and Trademark Office*